March 9, 1937.  B. B. KAHN  2,073,240
STOVE
Filed March 30, 1935   2 Sheets-Sheet 1

Inventor
Bertrand B. Kahn
by Marechal & Noe
Attorney

March 9, 1937.  B. B. KAHN  2,073,240
STOVE
Filed March 30, 1935  2 Sheets-Sheet 2

Inventor
Bertrand B. Kahn
Maréchal & Noe
Attorney

Patented Mar. 9, 1937

2,073,240

UNITED STATES PATENT OFFICE 2,073,240

STOVE

Bertrand B. Kahn, Cincinnati, Ohio, assignor to The Estate Stove Company, Hamilton, Ohio, a corporation of Ohio Application March 30, 1935, Serial No. 13,832

9 Claims. (Cl. 126—339)

This invention relates to cooking stoves and the like.

One object of the invention is the provision, in the oven or similar cooking compartment of a stove, of a rack operating bar adapted for engagement with the rear portion of the pan supporting rack or racks, the bar having an extension pivotally supported on a wall of the cooking compartment and being adapted for external operation so as to move the racks inwardly or outwardly on their supporting guides.

Another object of the invention is the provision of a rack operating means having provision for automatically disconnecting the same from the rack at the end of the returning movement of the operating means, to permit free withdrawal of the rack.

Other objects and advantages of the invention will be apparent from the following description, the appended claims and the accompanying drawings, in which,—

Figure 2:
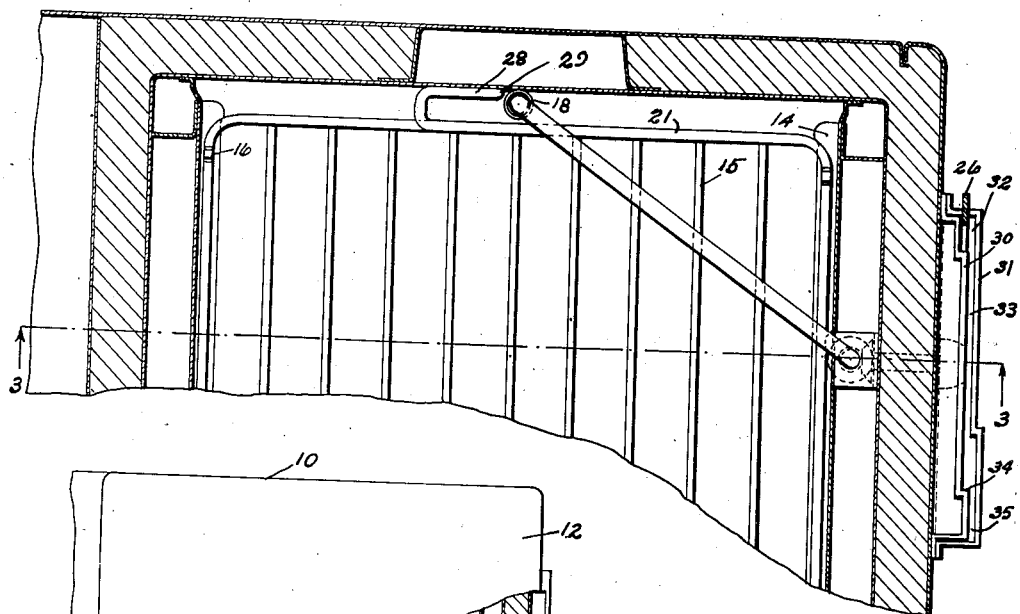
Fig. 2 is a horizontal section through the oven with the rack in its retracted position.

Referring more particularly to the drawings by reference numerals, 10 designates generally a cooking stove having an oven 11, provided with the usual gas or electric heating means which has not been illustrated as such heating means may be of any desirable form. The oven is defined by the side walls 12 including the vertical walls and top and bottom, the front of the oven compartment being closed by the door 13 which is hinged in any suitable manner so as to open outwardly to expose the front of the oven. On the laterally opposed vertical side walls 12 of the oven are rack supporting plates 14 which are provided with ribs or ridges along which the pan supporting racks or grids 15 are mounted for sliding movement. Each grid or rack 15 may be mounted at any desired height in the oven as it can be readily withdrawn and reinserted on a different pair of ridges of the plates 14. The side bars of the racks, adjacent their rear ends, are humped upwardly as at 16 to prevent any large amount of vertical play between the guide ridges.

In the usual form of stove construction it has been necessary to grasp the pan supporting racks in order to pull them part way out of the oven so as to expose the top of the pan or pans supported by them in order to ascertain whether or not the contents of the pans have been sufficiently cooked, or for basting or other reasons. Since the racks are very hot this has resulted in frequent burns to the hands, and has required a person to use a heat insulating pad of some sort in moving the racks either partly from or back into the oven. In accordance with the present invention, however, a means is provided externally of the stove which can be readily manipulated by the hand without danger of burns and which is adapted to move the racks regardless of their height location, this means being of a simple and inexpensive character, and of such character as to permit the racks to be pulled all the way out of the oven from their normal housed positions, whenever desired.

Figure 1:
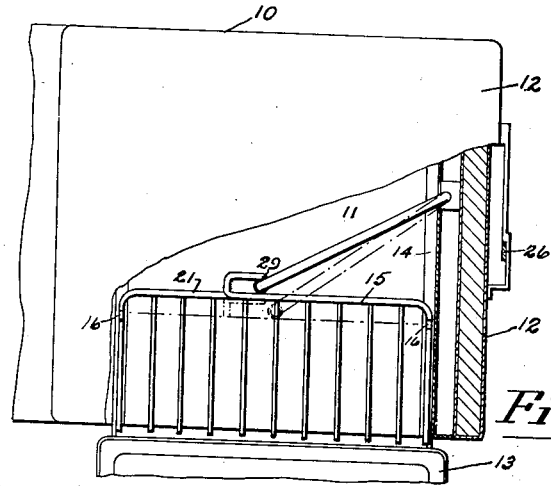
Fig. 1 is a top plan view of a cooking stove embodying the present invention, the upper portion of the oven being broken away, showing the pan supporting rack in an extended position.
Figure 3:
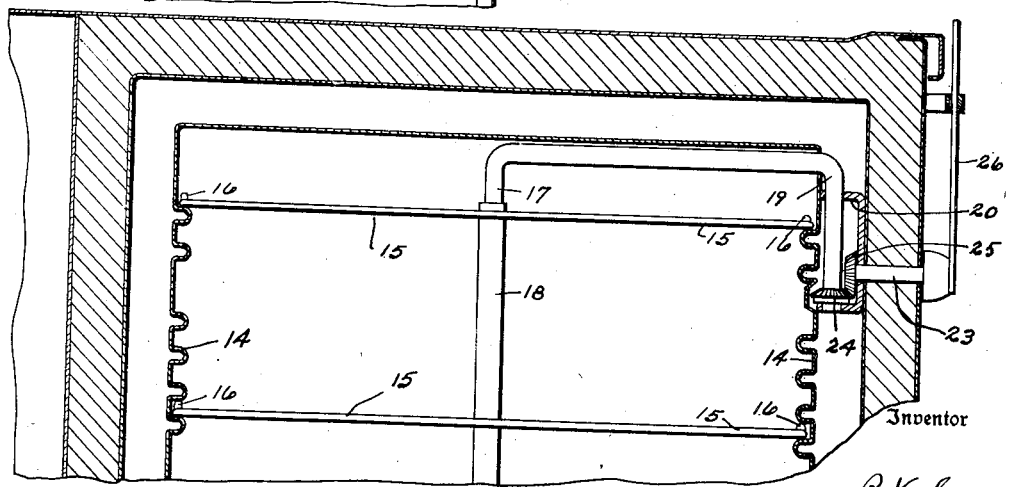
Fig. 3 is a vertical section taken on the line 3—3 of Fig. 2.

Referring to the form of construction illustrated in Figs. 1 to 3 inclusive, in which the invention is applied to a table top type of stove, the rack moving mechanism comprises a vertical bar 17 which extends downwardly along the rear wall of the oven when in its normal position as shown in Fig. 2, a sleeve member 18 being preferably carried by the bar for rotatable movement thereon. The upper end of the bar has an extension 19 which is rotatably mounted in a suitable bracket 20 provided on one of the walls of the oven at a substantial horizontal distance from the bar 17. The bar 17 is thus adapted for swinging movement in an arc of a circle, and when moved forwardly toward the front of the oven it pushes upon the rear side 21 of the rack 15 and thus moves the rack forwardly from its normal housed position.

The extension 19 is operated by means of a horizontal shaft 23, to which it is operatively coupled as by means of beveled pinions 24 and 25. The shaft 23 projects from the oven wall, its outer end being fixed to a hand lever 26 which can be swung forwardly toward the operator so as to move the bar 17 forwardly and effect outward movement of the pan supporting rack or racks. The rack 15 can thus be moved to an extended position illustrated in Fig. 1, in which about one-third of the rack is still retained within the oven and guided on the ribs of the supporting plates 14.

The bar 17 is adapted to retract the racks as well as to advance them, and in order that rearward movement of the bar 17 will retract the racks, each rack is provided rigidly with a hook shaped member 28 preferably arranged about midway between the sides of the oven. The end 29 of this hook member does not extend far enough toward the bar 17 to reach behind the bar when the latter is in its fully retracted position, so that when the bar is in such position, as illustrated in Fig. 2, the racks are entirely disconnected from the bar and may be grasped by the hand and pulled all the way from the oven in order to be reinserted at a different height. However, as soon as the bar is moved forwardly it swings toward the left as viewed in Fig. 2 and thus comes in front of the end 29 of the hook, and remains in front of the hook throughout the normal forward swinging movement of the bar and can, therefore, move the rack back into the oven when desired. It will be noted that the final returning movement of the lever 26 automatically disconnects the rack from the connecting means to permit free withdrawal of the rack while the connecting means and its operating hand lever remain stationary.

Stop means are provided in order to limit the forward travel of the bar 17 to such position as to maintain the bar in front of the end 29 of the hook so that normally the racks cannot be moved by the bar to such an extended position as to be inadequately supported by the ribs of the supporting plates 14. For this purpose, the side of the stove is shown as having metal straps 30 and 31 suitably spaced to provide a recess 32 in which the lever 26 is retained when the bar is in its fully retracted position. The lever, however, is sufficiently flexible so that its guided portion may be deflected toward the right and thus moved out of the recess 32 and the lever can then be moved forwardly in the slot 33 until it engages the stop 34, which limits the forward movement of the bar to such position that the rack is not moved more than about two-thirds of its length out of the oven. If desired, provision may be made for moving the bar still further in order to again clear the bar 17 from the hook 28, as shown in the position illustrated in dotted lines in Fig. 1, the lever 26 under such circumstances having been sprung further to the right and then moved into the slot 35. Inasmuch as the rack hook is entirely freed from the bar 17 when the latter is in its fully retracted position, however, it is not always necessary to provide for the release of the rack from the bar when the bar is in its extreme forward position.

It will be apparent that the operation of the racks is independent of the operation of the door 13, and it will also now be apparent that the operation of the racks can be effected in a very convenient manner and by means of a very simple construction embodying only a very few moving parts.

Figure 4:
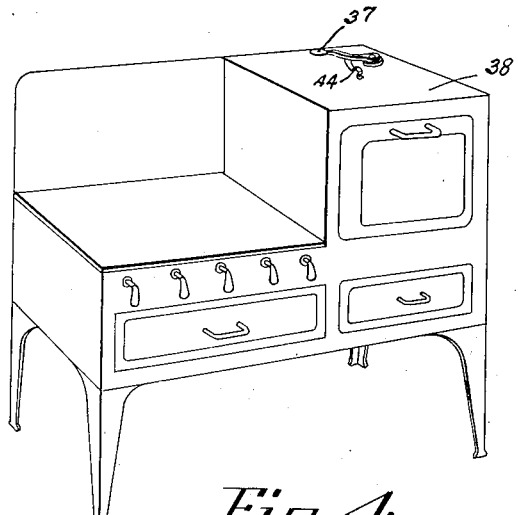
Fig. 4 is a perspective view of a stove having a modified form of rack moving device.
Figure 5:
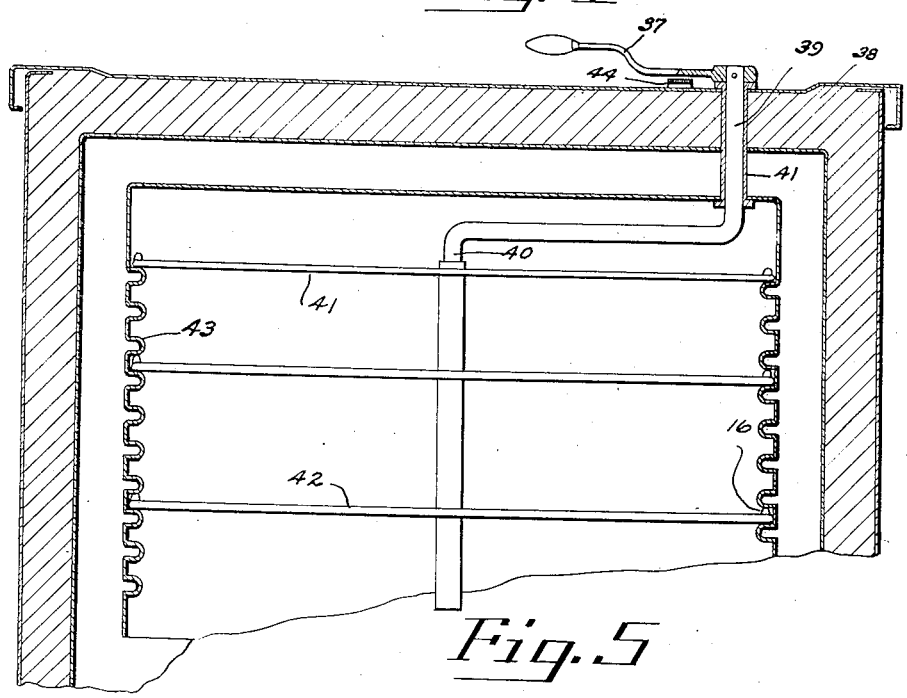
Fig. 5 is a vertical section corresponding to the construction illustrated in Fig. 4.

Figs. 4 and 5 show a modified form of construction which may be used, for example, on a stove in which the top of the oven is arranged some distance above the cooking top. In this form of construction the operating lever 37 is shown on the top of the oven 38. The lever 37 is connected to the upper end of an extension 39 of the bar 40, the extension 39 being rotatably mounted for movement about a vertical axis in the upper wall of the oven on a bearing sleeve 41. A stop member 44 is preferably provided to positively limit forward swinging movement of the bar to a position corresponding to a rack position in which the rack is about two-thirds extended from the oven. The cooperation between the bar 40 and the racks 41 and 42 and the manner in which the racks are mounted on the oven side walls 43 is similar to the form of construction previously described.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a cooking stove, a cooking compartment having a door, a rack, rack supporting means for slidably supporting the rack in said compartment at different selected heights, and means for moving said rack comprising a vertical bar having a laterally disposed extension pivotally supported on a wall of the compartment, said bar engaging between portions of the inner end of the rack and moving the rack inwardly and outwardly on said supporting means as the bar is operated, and means independent of the door and operable from the exterior of the compartment for moving said bar extension and bar.

2. In a cooking stove, a cooking compartment, a rack, stationary rack supporting means for slidably supporting the rack in said compartment at different selected heights, and means for moving said rack comprising a vertical bar extending throughout the height range of the rack supporting means and having a laterally disposed extension pivotally supported on a wall of the compartment, said bar engaging between portions of the inner end of the rack at any of said selected heights and moving the rack inwardly and outwardly on said supporting means as the bar is operated, and means operable from the exterior of the compartment for moving said bar extension and bar.

3. In a cooking stove, a cooking compartment, a rack having a hook at its inner end and rigid therewith, rack supporting means for slidably supporting the rack within the cooking compartment at different selected heights, and means for moving said rack comprising a vertical bar engageable with said hook and moving the rack inwardly and outwardly on said supporting means when the bar is moved, and movable to a position laterally outward of the end of said hook so as to clear the end of said hook when the rack is in a predetermined position to provide for free withdrawal of the rack, said bar having an extension pivotally supported on a wall of the compartment on a vertical axis spaced a substantial horizontal distance from the vertical bar, and means operable from the exterior of the compartment for moving said bar extension and said bar about said axis.

4. In a cooking stove, a cooking compartment, a rack having a hook at its inner end and rigid therewith, rack supporting means provided within said compartment for slidably supporting the rack in the cooking compartment at different selected heights, and means for moving said rack comprising a vertical bar engageable with said hook and moving the rack inwardly and outwardly on said supporting means when said bar is moved, and movable to a position laterally outward of the end of said hook so as to clear the end of said hook when the rack is in retracted position to provide for free withdrawal of the rack, said bar having an extension pivotally supported on a wall of the compartment on a vertical axis spaced a substantially horizontal distance from the vertical bar, and a hand lever operable from the exterior of the compartment for moving said bar extension and said bar about said axis.

5. In a cooking stove, a cooking compartment, a rack, rack supporting means for slidably supporting the rack within the cooking compartment at selected different heights, and means for moving said rack comprising a vertical bar engageable in pushing and pulling relationship with the inner end of the rack and sliding the rack inwardly and outwardly on said supporting means when said bar is moved, said bar having a lateral extension at its upper end at the top of the cooking compartment pivotally supported on a vertical axis on a wall of the compartment adjacent a side of the rack, and means operable from the exterior of the compartment for moving said bar extension and bar in an arcuate path.

6. In a cooking stove, a cooking compartment, a rack, rack supporting means for slidably supporting the rack within the cooking compartment at selected different heights, means for moving said rack comprising a vertical bar engageable in pushing and pulling relationship with the inner end of the rack and sliding the rack inwardly and outwardly on said supporting means when said bar is moved, said bar having an extension pivotally supported on a wall of the compartment, means operable from the exterior of the compartment for moving said bar extension and bar forwardly in an arcuate path to move the rack outwardly, and stop means for limiting the forward swinging movement of said bar to a position in which engagement between said bar and said rack is maintained.

7. In a stove, a cooking compartment having a pan supporting rack slidably guided for horizontal movement therein and having a normal position housed within said compartment, a door for said compartment, an operating device independent of the compartment door and provided outside the compartment, and connecting means operably connecting said rack and device and moving said rack forwardly from its normal position and for returning the rack to its normal position, as the connecting means is moved, and means cooperating with said connecting means for disconnecting the rack from said connecting means as a result of final returning movement of said device to permit free withdrawal of the rack.

8. In a stove, a cooking compartment having a rack slidably guided therein and having a normal position housed within the compartment, a door for said compartment, an operating device independent of the compartment door and outside the compartment, and connecting means which is free of the rack when the rack is in its normal position so that the rack can be freely withdrawn without disturbing the connecting means, said connecting means having a laterally movable portion which is automatically movable by initial movement of said operating device into pulling and pushing engagement with the rack so that subsequent movements of the operating device can move the rack, by lateral movement of that part of said connecting means which engages the rack, inwardly and outwardly as desired.

9. In a stove, a cooking compartment, a pan supporting rack, means fixed in said compartment for slidably supporting said rack at a number of different heights within the compartment, an operating device accessible from the exterior of the compartment, and connecting means supported for pivotal movement on a wall of the compartment and operably connecting said rack and device in any of the selected height positions of the rack for moving said rack forwardly from a normal position within the compartment and for returning the rack to its normal position, said connecting means having provision for automatically disconnecting the same from the rack when the rack is in its normal position by the final returning movement of said device.

BERTRAND B. KAHN.